(12) United States Patent
Cook (10) Patent No.: US 7,648,249 B2
(45) Date of Patent: Jan. 19, 2010

(54) BEAM-STEERING APPARATUS HAVING FIVE DEGREES OF FREEDOM OF LINE-OF-SIGHT STEERING

(75) Inventor: Lacy G. Cook, El Segundo, CA (US)

(73) Assignee: Raytheon Company, Waltham, MA (US)

( * ) Notice: Subject to any disclaimer, the term of this patent is extended or adjusted under 35 U.S.C. 154(b) by 49 days.

(21) Appl. No.: 11/980,289

(22) Filed: Oct. 30, 2007

(65) Prior Publication Data

US 2009/0109561 A1 Apr. 30, 2009

(51) Int. Cl.
*G02B 5/08* (2006.01)
(52) U.S. Cl. ..................................................... 359/861
(58) Field of Classification Search ................. 359/633, 359/850, 855, 856, 857, 871, 872
See application file for complete search history.

(56) References Cited

U.S. PATENT DOCUMENTS

| 5,296,972 | A | 3/1994 | McKinley |
| 2006/0151449 | A1 | 7/2006 | Warner et al. |
| 2006/0215725 | A1* | 9/2006 | Wiessner et al. ............ 372/107 |

FOREIGN PATENT DOCUMENTS

| EP | 0154865 A1 | 9/1985 |
| FR | 2569865 A1 | 3/1986 |

OTHER PUBLICATIONS

Muth et al. "X/Y-Scankopf Fur Die Laserstrahlpositionierung—X/Y Scanning Head for Laser Beam Positioning", F&M; Feinwerktechnik Mikrotechnik Messtechnik, Hanser, Munchen, DE, vol. 102, No. 10, Oct. 1, 1994, pp. 521-524.

(Continued)

*Primary Examiner*—Euncha P Cherry
(74) *Attorney, Agent, or Firm*—Pillsbury Winthrop Shaw Pittman, LLP (57) ABSTRACT

A beam-steering apparatus comprises a set of planar tiltable mirrors positioned to define a light beam path therebetween. The set of planar tiltable mirrors comprises from three to five planar tiltable mirrors. Each of the planar tiltable mirrors has a center of rotation lying in a plane of the mirror and each of the planar tiltable mirrors is tiltable about one axis of rotation or two orthogonal axes of rotation that lie in the plane of the mirror. The total number of axes of rotation about which the planar tiltable mirrors of the set of planar tiltable mirrors can tilt is at least five. A mirror drive system tilts each respective planar mirror about its respective axis of rotation or axes of rotation. With this apparatus, an input or output light beam path is steerable over two angular, one rotational, and two lateral-position degrees of freedom.

20 Claims, 5 Drawing Sheets

OTHER PUBLICATIONS

Schenk et al. "A Resonantly Excited 2D-Micro-Scanning-Mirror with Large Deflection"; Sensors and Actuators A, Elsevier Sequoia S.A., Lausanne, CH, vol. 89, No. 1-2, Mar. 20, 2001, pp. 104-111.

Beckman et al. "The Longitudinal Polarimeter at HERA", Nuclear Instruments & Methods in Physics Research, Section—A: Accelerators, Spectrometers, Detectors and Associated Equipment, Elsevier, Amsterdam, NL, vol. 479, No. 2-3, Mar. 1, 2002, pp. 334-348.

PCT, "Notification of Transmittal of the International Search Report and the Written Opinion of the International Searching Authority, or Declaration", Mar. 25, 2009, 10 pp total.

Notification of Transmittal of the International Preliminary Report on Patentability dated Oct. 5, 2009 for International Application No. PCT/US2008/081797.

* cited by examiner

BEAM-STEERING APPARATUS HAVING FIVE DEGREES OF FREEDOM OF LINE-OF-SIGHT STEERING

This invention relates to the steering of the line-of-sight of a beam such as a light beam and, more particularly, to apparatus that provides five degrees of freedom of line-of-sight steering using only planar tiltable mirrors.

BACKGROUND OF THE INVENTION

In many applications, a radiation source (such as a laser) or a detector (such as a focal plane array or FPA) is maintained stationary, and the output beam of the radiation source or the input beam of the detector is aimed in a desired direction using a reflective and/or refractive beam-steering apparatus. Thus, for example, an image generator may remain stationary, and the output image beam is aimed by movable mirrors and/or lenses. Similarly, an imaging focal plane array detector may remain stationary, and the area of space to be imaged is selected by movable mirrors and/or lenses.

Familiar types of beam-steering apparatus include azimuth-elevation, roll-nod, and roll-pitch gimbals. The rotation of the gimbaled structure about two axes allows the line-of-sight beam output or the line-of-sight beam input direction to be selected for an available range of elevations and azimuths. The elevation and azimuth represent two angular degrees of freedom.

A more complex problem arises where the line-of-sight must be steered in more than two degrees of freedom, and as many as five degrees of freedom. These additional degrees of freedom can include a rotational degree of freedom, that is, the rotation of the image about the line of sight. There may also be a requirement for steering one or two lateral-position degrees of freedom. These lateral-position degrees of freedom include the lateral movement of the line of sight, such as the lateral position of an entrance or exit pupil.

Control of the rotational of the line of sight about the beam axis is an important consideration in imaging systems. For example, if the system includes a focal plane array detector and the movement of the imaging optics causes the image on the focal plane array to rotate, the analysis of the image may become more difficult. Optical de-rotation devices such as K-mirrors or Pechan prisms have been developed to control the rotation of the image about the line of sight. Such de-rotation devices are typically used serially with multiple mirrors that provide two-dimensional angular beam steering and two lateral-position degrees of freedom. The resulting apparatus that provides five degrees of freedom of the beam steering is large, heavy, and complex, because it requires that a portion of the apparatus rotates as an assembly about the line of sight.

There is a need for a beam-steering apparatus that provides up to five degrees of beam-steering freedom, yet is relatively small, light, and simple in construction. The present invention fulfills this need, and further provides related advantages.

SUMMARY OF THE INVENTION

The present invention provides a beam-steering apparatus that permits up to five degrees of freedom of the steering of the line-of-sight output beam or input beam. That is, it provides steerability of the line-of-sight in two angular degrees of freedom (elevation and azimuth), one rotational degree of freedom about the line of sight, and two lateral degrees of freedom. The beam-steering apparatus includes three, four, or five tiltable planar (i.e., flat, unpowered) mirrors that may each be tilted about one axis of rotation or two axes of rotation. It may also include non-tilting fold mirrors or other elements. The use of three, four, or five planar tiltable mirrors to achieve five degrees of freedom of the steering of the line-of-sight output or input beam is a great improvement over, and simplification of, the approaches normally used to achieve even fewer degrees of freedom. It reduces the weight, size, and complexity of the apparatus required to achieve the beam steering, and offers the system designer great flexibility in the selection of components. Because the beam-steering apparatus uses only mirrors, chromatic aberration is avoided. The present approach utilizes the angular cross-coupling effect experienced in an image when a mirror is tilted to the side, normally considered as a disadvantage in optical systems, to achieve beam steering in five degrees of freedom.

In accordance with the invention, a five-degree-of-freedom beam-steering apparatus comprises a set of planar tiltable mirrors positioned to define a radiation (such as light) beam path therebetween. The set of planar tiltable mirrors comprises from three to five planar tiltable mirrors. Each of the planar tiltable mirrors has a center of rotation lying in a plane of the planar mirror, and each of the planar tiltable mirrors is tiltable about one axis of rotation or two orthogonal axes of rotation that lie in the plane of the planar mirror. A planar mirror drive system tilts each respective planar mirror about its respective axis of rotation or axes of rotation. The total number of axes of rotation about which the planar tiltable mirrors of the set of planar tiltable mirrors can tilt is at least five, and even more preferably is exactly five.

More specifically, a five-degree-of-freedom beam-steering apparatus comprises a set of planar tiltable mirrors positioned to define a light beam path therebetween. The set of planar tiltable mirrors comprises from three to five planar tiltable mirrors, wherein each of the planar tiltable mirrors has a center of rotation lying in a plane of the mirror. Each of the planar tiltable mirrors is tiltable about one axis of rotation or two orthogonal axes of rotation that lie in the plane of the mirror. The total number of axes of rotation about which the planar tiltable mirrors of the set of planar tiltable mirrors can tilt is at least five. An input or output light beam path is thereby steerable over two angular, one rotational, and two lateral-position degrees of freedom. A mirror drive system tilts each respective planar mirror about its respective axis of rotation or axes of rotation.

The set of planar mirrors of the beam-steering apparatus may include other components such as one or more non-tilting fold mirrors.

The set of planar mirrors may comprise exactly three planar tiltable mirrors. Two of the planar mirrors are tiltable about exactly two axes of rotation that lie in the plane of the planar mirror, and one of the planar mirrors is tiltable about at least one axis of rotation that lies in the plane of the mirror. Alternatively, two of the planar mirrors are tiltable about exactly two axes of rotation that lie in the plane of the mirror, and one of the planar mirrors is tiltable about exactly one axis of rotation that lies in the plane of the mirror.

The set of planar mirrors may comprise exactly four planar tiltable mirrors. One of the planar mirrors is tiltable about two axes of rotation that lie in the plane of the mirror, and three of the planar mirrors are tiltable about at least one axis of rotation that lies in the plane of the mirror. Alternatively, one of the planar mirrors is tiltable about exactly two axes of rotation that lie in the plane of the mirror and three of the planar mirrors are tiltable about exactly one axis of rotation that lies in the plane of the mirror.

The set of planar mirrors may comprise exactly five planar tiltable mirrors. All five of the planar mirrors are tiltable about at least one axis of rotation that lies in the plane of the mirror. Alternatively, all five of the planar mirrors are tiltable about exactly one axis of rotation that lies in the plane of the mirror.

In a particularly preferred form, the set of planar tiltable mirrors includes at least two planar tiltable mirrors having the one axis of rotation or the two orthogonal axes of rotation consisting of, for each of the two planar tiltable mirrors, a second axis that lies in the plane of the mirror and is orthogonal to a first axis that lies in the plane of the mirror and is perpendicular to a reflecting plane containing an incident ray and a reflected ray.

That is, the number of active, planar tiltable mirrors may be three, four, or five in number. The apparatus with three active, planar tiltable mirrors is mechanically more complex, because more of the planar mirrors must be tilted about two axes of rotation, but it is lighter and more compact in some embodiments. The apparatus with five active, planar tiltable mirrors is mechanically less complex, because none of the planar mirrors must be tilted about two axes of rotation. Thus, the selection of whether the beam-steering apparatus is to have three, four, or five planar mirrors involves design tradeoffs for specific applications.

There may be a support structure in which the set of planar mirrors is supported. In one embodiment, the set of planar mirrors is not rotatable as an ensemble with respect to the support structure.

The mirror drive system may tilt the respective planar mirrors by any amount to achieve the necessary beam steering. In one embodiment, the mirror drive system tilts the planar mirrors in each case about its axis of rotation or axes of rotation by an amount of not more than 10 degrees, and in another embodiment by not more than 1 degree. Larger tilts may also be used.

Each of the planar mirrors of the set of planar tiltable mirrors preferably tilts by approximately the same amount as the line-of-sight input our output beam is steered. It is preferred that the individual planar mirrors of the set of tiltable mirrors not tilt more than 150 percent of the angular movement of the line of sight. That is, if the line-of-sight input or output beam is steered by X degrees, the tilting of any of the planar mirrors of the set of planar tiltable mirrors preferably does not exceed 1.5X degrees. This preference for limiting the tilting of the tiltable mirrors to about the same magnitude as the angular movement of the line-of-sight input or output beam results from two considerations. First, the larger the amount of tilting, the more difficult it is to achieve that tilting, due to considerations of mechanical movement, inertia, and mass. Second, larger mirror tilts tend to induce beam wander (i.e., undesired lateral movement) of the reflected beam at certain locations along the beam path. Such beam wander may in some cases be corrected at selected locations through the rotations of the other mirrors, but the correction itself may add even further beam wander at other locations that may be disadvantageous.

The planar mirrors may be arranged geometrically so that the center of rotation of each of the planar mirrors is positioned at a vertex of a geometrical shape defining a portion of a parallelopiped. Most preferably for this approach, the parallelopiped is a rectangular parallelopiped, such as a cube. The centers of rotation may be in a two-dimensional arrangement at the vertices of the parallelopiped, although more normally they are in a three-dimensional arrangement at the vertices of the parallelopiped.

The present apparatus allows the line of sight (that is, the light input or light output, depending upon the application) to be steered in five degrees of freedom, using only planar tiltable mirrors that tilt by relatively small amounts about one axis of rotation or two axes of rotation. The planar mirrors can be limited in size to no larger than necessary for the cross-sectional size of the beam, thereby keeping the size and mass of the beam-steering apparatus small. The mass that has to be moved is small and of low inertia, and moves only through small tilting angles, as compared with conventional approaches such as those that include prism-type or mirror-type rotation-control devices that move through large angles. The size of the mirror drive system depends upon how much rotational tilting is required in the planar mirrors. In many applications the extent of rotational tilting is small, less than 10 degrees and often less than 1 degree. For such small-tilt applications, the mirror drives can be voice coils or the like, which are extremely light and compact, dependable, of low power consumption, and fast acting.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
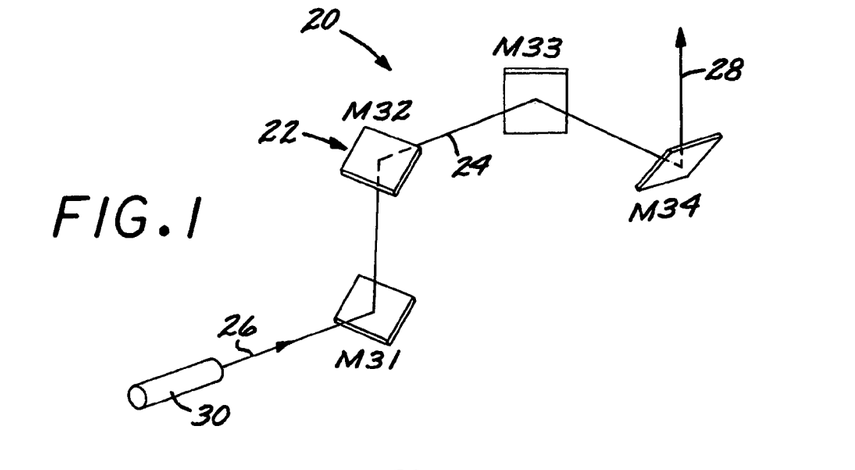
FIG. 1 is a schematic perspective depiction of a beam-steering apparatus using three planar tiltable mirrors.
Figure 2:
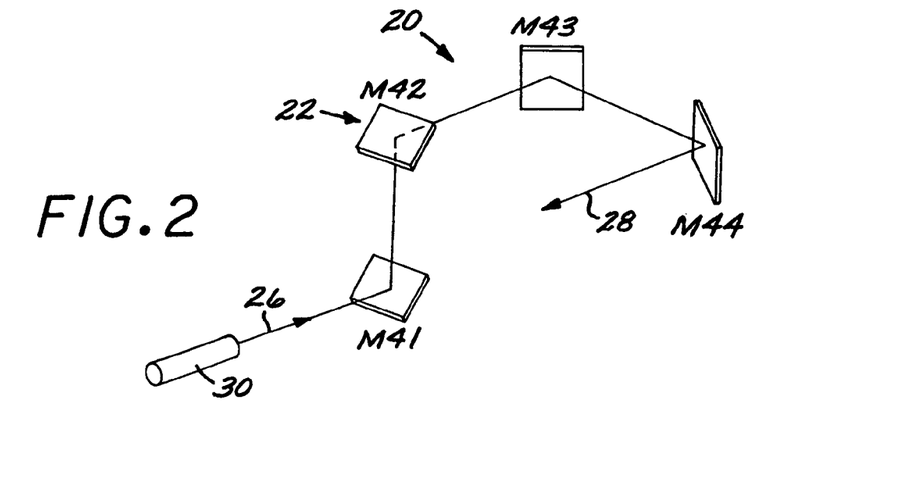
FIG. 2 is a schematic perspective depiction of a beam-steering apparatus using four planar tiltable mirrors.
Figure 3:
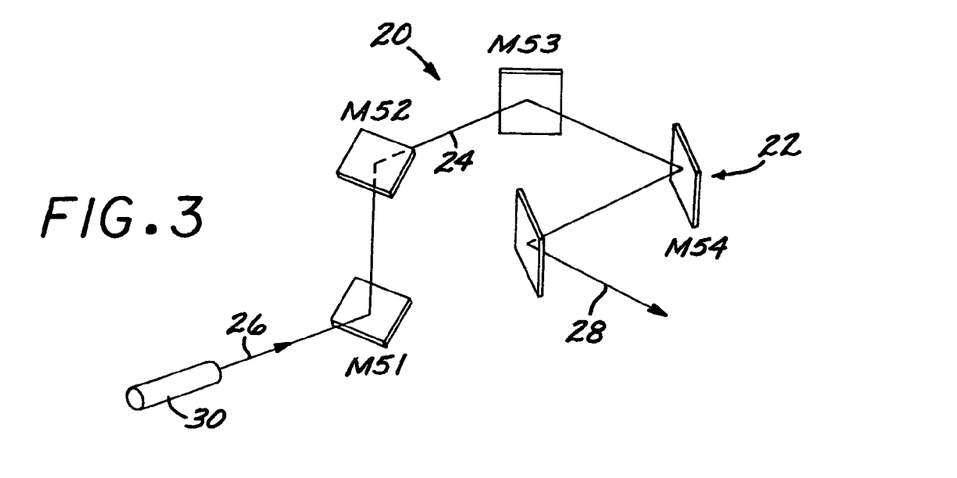
FIG. 3 is a schematic perspective depiction of a beam-steering apparatus using five planar tiltable mirrors.

Each of FIGS. 1, 2, and 3 depicts an example of a five-degree-of-freedom beam-steering apparatus 20. The beam steering apparatus 20 includes a set 22 of planar tiltable mirrors. The planar mirrors of the set 22 of planar tiltable mirrors are positioned to define a radiation (usually light) beam path 24 that reflects therebetween with a light input 26 to the set 22 of mirrors and a light output 28 from the set 22 of mirrors. There is typically a light transceiver 30 at the light input 26 or the light output 28. If the light transceiver 30 is at the light input 26 as illustrated in the figures, the light transceiver 30 is preferably a light source such as a laser. If the light transceiver 30 is at the light output 28, the light transceiver 30 is preferably a light receiver such as an imaging detector. For clarity, the following discussion will address the case where the light transceiver 30 is a light source, so that the light output 28 is the steerable line-of-sight beam. Under the reciprocal principles of optics, the same principles apply to the case where the light transceiver 30 is a light receiver such as a focal-plane-array detector positioned to receive the light output 28, and in that case the light input 26 is the steerable line-of-sight beam.

The set 22 of planar tiltable mirrors comprise from three to five active, planar tiltable mirrors. That is, the set 22 includes exactly three, exactly four, or exactly five planar tiltable mirrors. In the embodiment of FIG. 1, there are three planar tiltable mirrors. In the embodiment of FIG. 2, there are four planar tiltable mirrors. In the embodiment of FIG. 3, there are five planar tiltable mirrors. There may also be inactive, non-tiltable mirrors in some cases, and the arrangement of non-tiltable mirrors and tiltable mirrors will be discussed subsequently. In the "M" notation of FIGS. 1-3 (and FIGS. 6-11), the first number after the M refers to the number of planar tiltable mirrors that are present, and the second number after the M refers to the sequential number of the tiltable or non-tiltable mirror. For example, the M32 planar mirror of FIG. 1 is the second mirror in a set having three planar tiltable mirrors. The second mirror M32 may be tiltable or non-tiltable. There may be more mirrors than the number of planar tiltable mirrors, so the second number after the M may be larger than the first number. Exactly three (embodiment of FIG. 1), exactly four (embodiment of FIG. 2), or exactly five (embodiment of FIG. 3) of the planar mirrors are active, planar tiltable mirrors. There may also be present one or more inactive, non-tiltable mirrors to fold the light beam path 24 to help define the geometry of the beam-steering apparatus. Some specific arrangements of the mirrors will be discussed subsequently.

Figure 4:
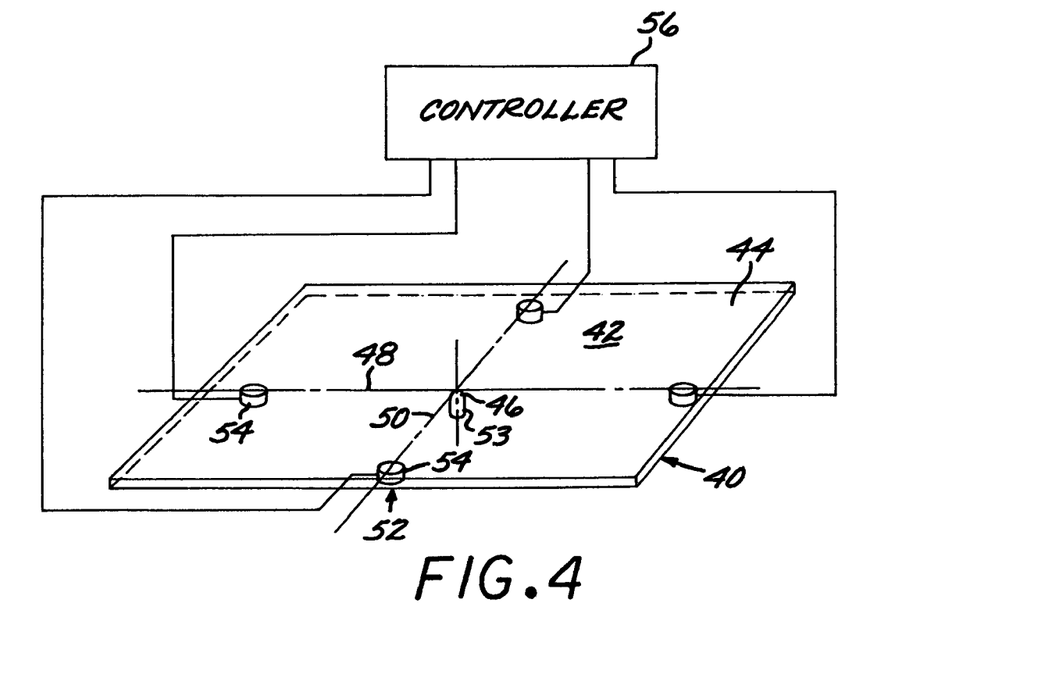
FIG. 4 is a schematic perspective depiction of a planar tiltable mirror of the type that may be used in the beam-steering apparatus of FIGS. 1-3.

FIG. 4 depicts an active, planar tiltable mirror 40. The planar tiltable mirror 40 is an optically unpowered, flat planar mirror having mirror plane 42 defined by a planar face 44 of the planar mirror 40. The planar tiltable mirror 40 is of a construction that reflects the radiation of interest, typically a light beam in the ultraviolet, visible, and/or infrared wavelength bands. The planar tiltable mirror 40 has a center of rotation 46 lying in the plane of the mirror. The planar tiltable mirror 40 is tiltable about a first axis of rotation 48 that lies in the plane 42 of the planar mirror 40, tiltable about a second axis or rotation 50 that lies in the plane 42 of the planar mirror 40 and is orthogonal to the first axis of rotation 48, or tiltable about both axes of rotation 48 and 50. The first axis of rotation 48 and the second axis of rotation 50, where present, intersect at the center of rotation 46.

The axes of rotation 48 and 50 are defined in the following manner. When a light ray reflects from the planar mirror 40, the incident ray and the reflected ray both lie in and are contained in a plane termed a "reflecting plane". The first axis 48 is the line that lies in the plane of the mirror 40 from which the ray reflects, and is orthogonal to the reflecting plane for the reflected light ray. The second axis 50 lies in the plane of the mirror and is orthogonal to the first axis 48. These definitions are applicable for all of the planar mirrors of the set 22 of planar mirrors. According to these definitions, the first axis 48 for one planar mirror of the set 22 of planar mirrors is not in general parallel to the first axis 48 for another planar mirror of the set 22 of planar mirrors, nor is the second axis 48 for one planar mirror of the set 22 of planar mirrors in general parallel to the second axis 50 for another planar mirror of the set 22 of planar mirrors. As may be required for a particular configuration of the set 22 of planar mirrors, any particular planar mirror may be tiltable only about the first axis 48 but not the second axis 50, may be tiltable only about the second axis 50 but not the first axis 48, or may be tiltable about both the first axis 48 and the second axis 50. There may also be non-tiltable fold mirrors.

When the planar mirror 40 tilts about the first axis 48 (as defined above), the reflected ray stays within the original reflecting plane. There is no rotation of the field of view about the line of sight; that is, there is no angular cross coupling. When the planar mirror 40 tilts about the second axis 50 (as defined above), the reflected ray does not stay within the original reflecting plane. There is rotation of the ray and of the corresponding field of view about the line of sight. That is, there is angular cross coupling. In order to achieve rotation of the field of view, there must be tilting of at least one of the planar mirrors of the set of mirrors 22 about the second axis 50. Preferably, there is tilting of at least two of the planar mirrors of the set of mirrors 22 about the second axis 50.

A mirror drive system 52 tilts the planar mirror 40 about its respective single axis of rotation 48 or 50, or two axes of rotation 48 and 50. The planar mirror is preferably supported in some manner, such as a flex pivot 53 illustrated in FIG. 4. Flex pivots are known for other applications. The flex pivot 53 supports the planar mirror 40 and also permits tilting of the planar mirror 40 about one or two axes of tilting, according to the selected construction of the flex pivot 53. Alternatively, the planar mirror 40 may be supported on one or two axles having the appropriate bearings. The flex pivot 53 is often preferred, as it is simpler in construction (particularly where tilting about two axes is required), smaller in size and mass, and avoids practical difficulties associated with bearings such as manufacturing difficulty, lubrication, and alignment.

The drive system 52 may use actuators 54 of any operable type to accomplish the tilting of the planar mirrors 40. For small maximum tilts of less than about 10 degrees, the actuators 54 may be, for example, voice coils as illustrated in FIG. 3. Other types of actuators including, for example, electric motors, linear drives, or torquers may be used. The operation of all of the actuators 54 is coordinated and directed by a controller 56.

The structure of the active, planar tiltable mirror 40 is that used for each of the planar tiltable mirrors of the embodiments of FIGS. 1-3 and 6-11. The actuators of the drive system 52 for all of the planar tiltable mirrors is coordinated by the controller 56.

In some embodiments, there may also be inactive, non-tiltable mirrors. The inactive, non-tiltable mirrors are typically planar mirrors that serve to fold the light beam path 24. The inactive, non-tiltable mirrors are fixed in space relative to the other mirrors. The non-tiltable mirrors have the same construction as the tiltable mirrors, but without any tilting capability.

Figure 5:
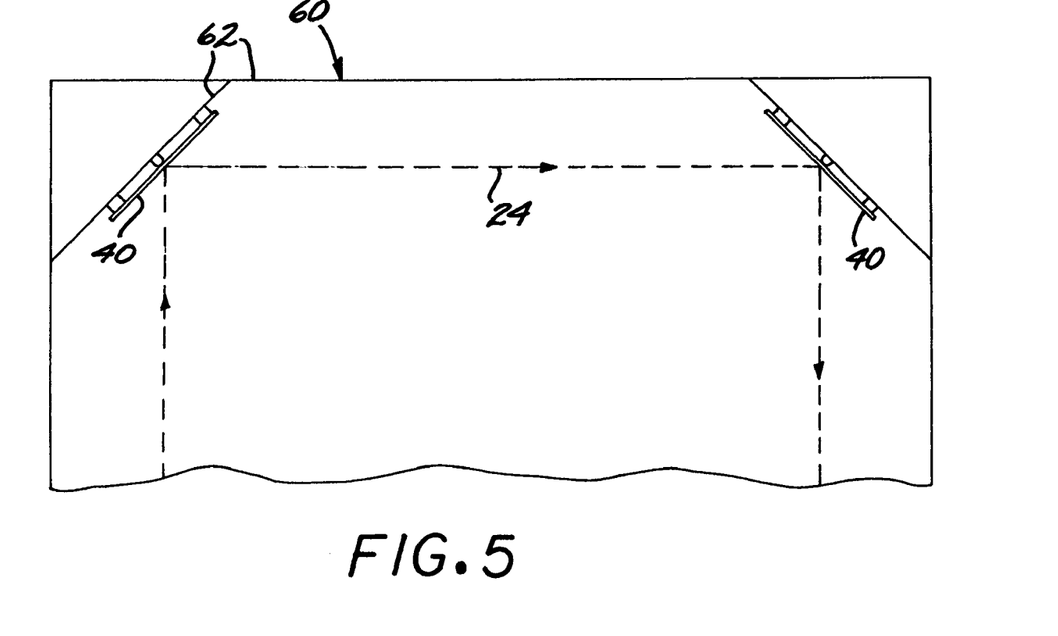
FIG. 5 is a schematic elevational depiction of a portion of a support structure operable with the beam-steering apparatus.
Figure 6:
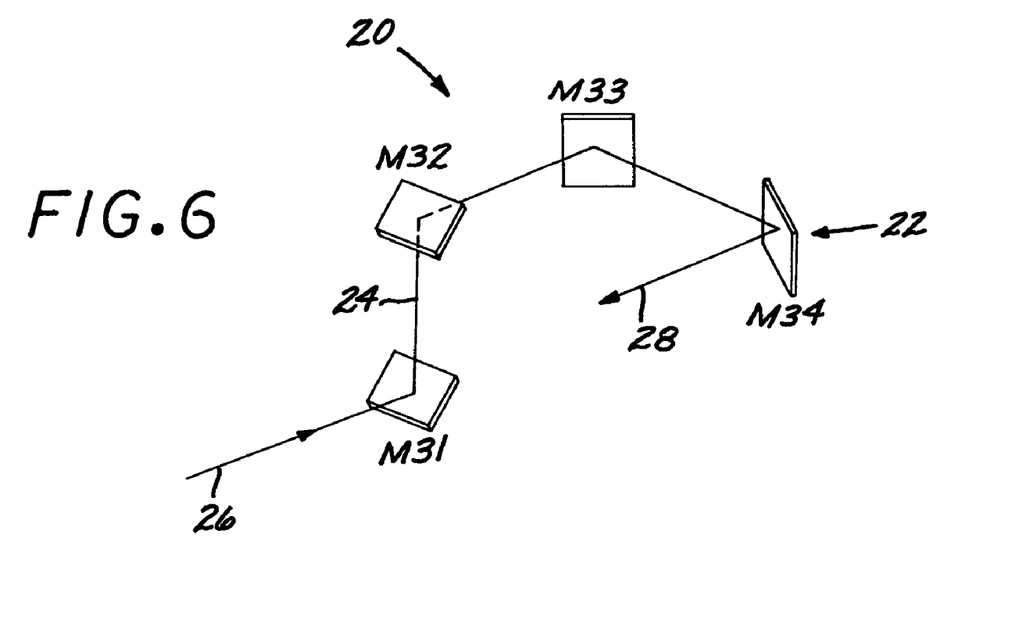
FIGS. 6-11 are schematic perspective depictions of examples of beam-steering apparatus.
Figure 7:
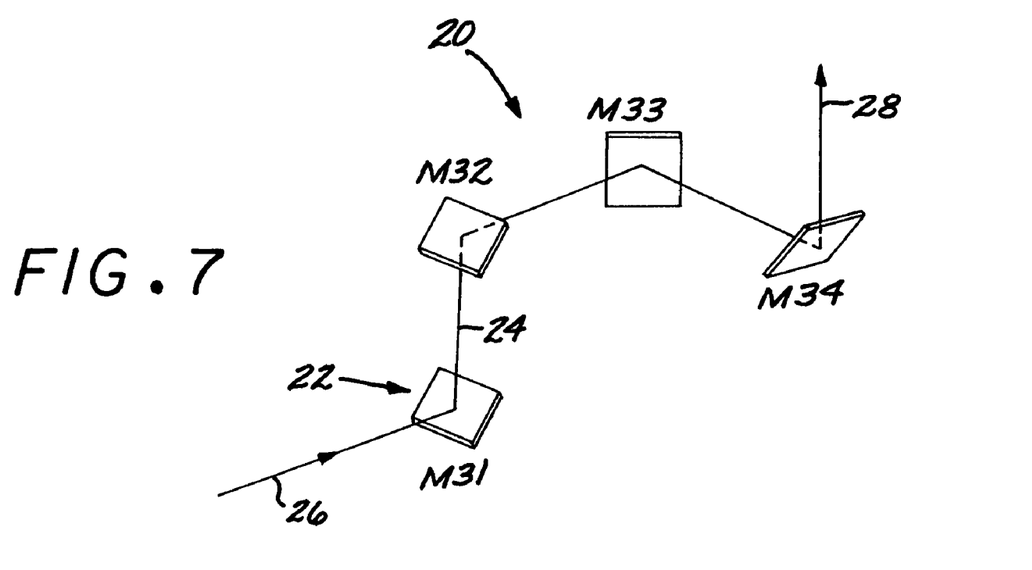
Figure 8:
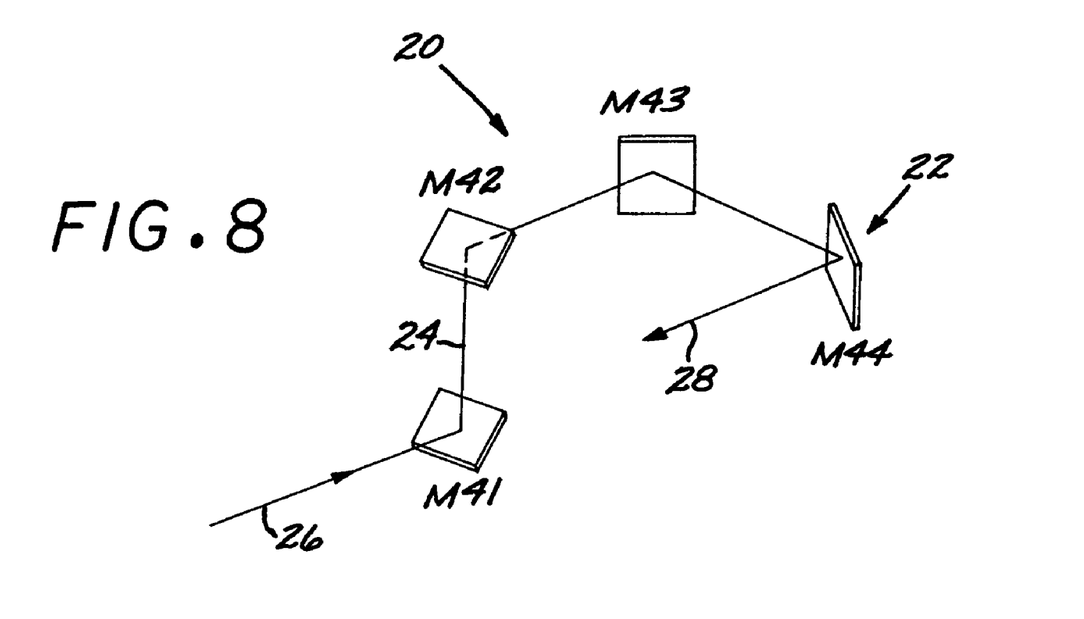
Figure 9:
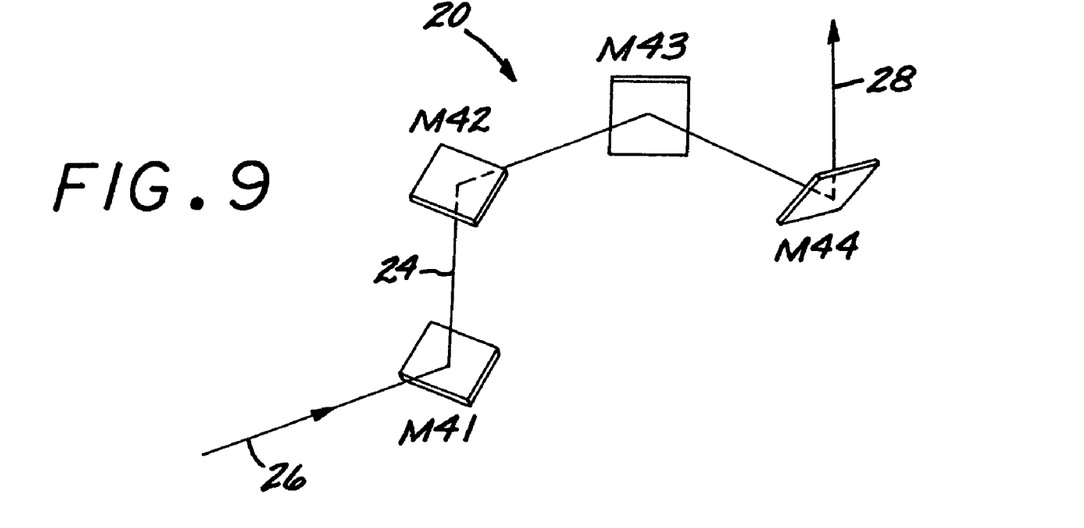
Figure 10:
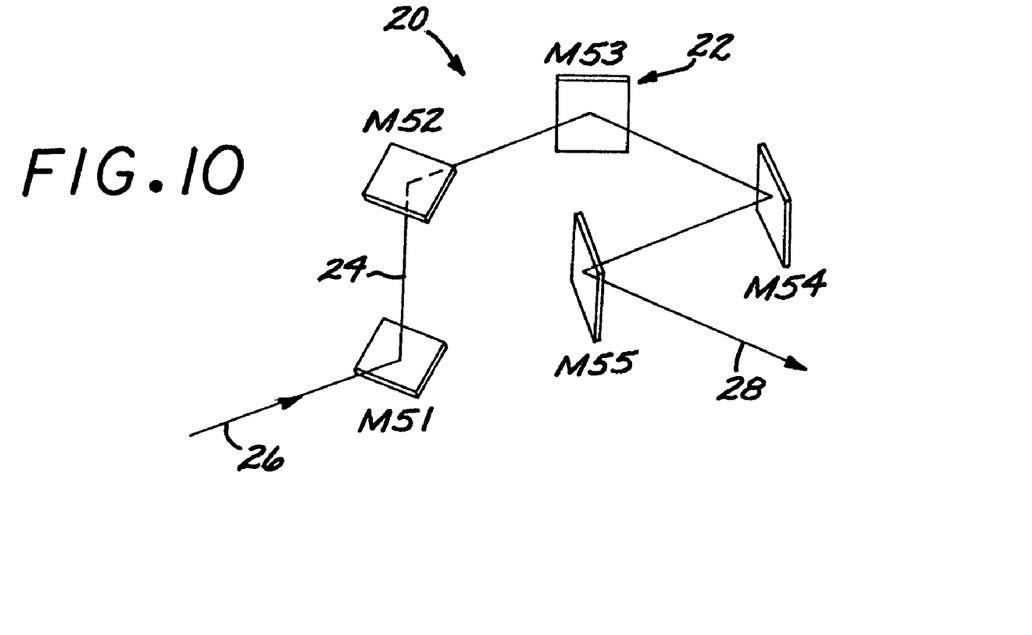
Figure 11:
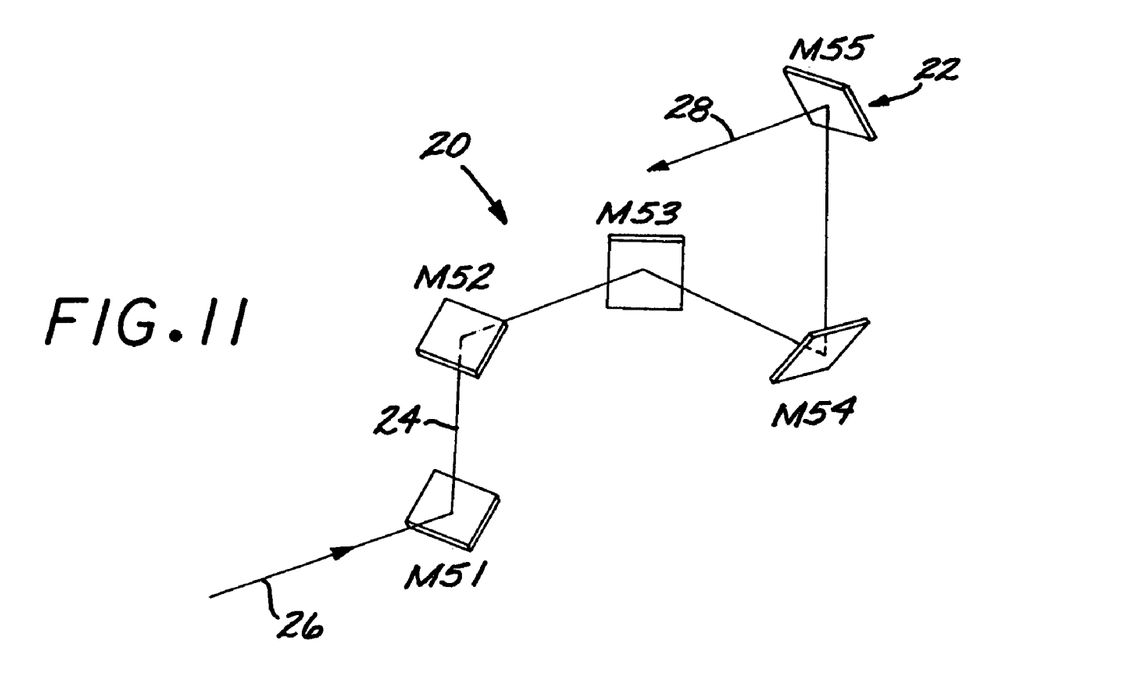

The mirrors are supported in an arrangement that defines the radiation beam path 24 (typically a light beam) therebetween. FIG. 5 depicts an example of a support structure 60 in which the planar tiltable mirrors and the planar non-tiltable mirrors are supported. There is a support 62, often in the form of a housing 62 that protects the supported mirrors. The planar tiltable mirrors 40 and any non-tiltable mirrors are affixed to the support 62, so that the planar tiltable mirrors 40 may be tilted by their actuators and the nontiltable mirrors are stationary relative to the support 62. This arrangement defines the radiation beam path 24 that reflects from mirror to mirror. In a preferred embodiment, the mirrors are not rotatable as an ensemble with respect to the support structure.

The three-mirror embodiment of FIG. 1, the four-mirror embodiment of FIG. 2, and the five-mirror embodiment of FIG. 3 embody the principle that the total number of axes of rotation about which the planar tiltable mirrors of the set of planar tiltable mirrors can tilt is at least five, and preferably exactly five, in all cases. (That is, each tiltable mirror is tiltable about one or two axes. The number of tilting axes for each of the tiltable mirrors of the set 22 is added together, and the result is at least five, or preferably exactly five.) Consequently, the line-of-sight beam (i.e., the light input 26 or the light output 28 beam path depending upon the application) is steerable over two angular, one rotational, and two lateral-position degrees of freedom.

In the case of the embodiment of FIG. 1 having three active planar mirrors, two of the planar mirrors M31, M32, M33, and M34 are tiltable about two axes of rotation that lie in the plane of the planar mirror and one of the planar mirrors M31, M32, M33, and M34 is tiltable about at least one axis of rotation that lies in the plane of the planar mirror. Preferably, two of the planar mirrors M31, M32, M33, and M34 are tiltable about exactly two axes of rotation that lie in the plane of the planar mirror and one of the planar mirrors M31, M32, M33, and M34 is tiltable about exactly one axis of rotation that lies in the plane of the planar mirror. The total number of axes of rotation of the planar mirrors M31, M32, M33, and M34 is at least five, and preferably exactly five. In this illustrated embodiment of FIG. 1, there are four planar mirrors M31, M32, M33, and M34, but only three of the four planar mirrors are tiltable. One of the planar mirrors M31, M32, M33, and M34 is a non-tiltable, fixed, beam-folding mirror. The fixed mirror aids in achieving a usable geometric relationship of the planar tiltable mirrors, but does not contribute to the total number of tiltable axes of rotation of at least or exactly five.

The total number of axes of rotation equaling at least five, and preferably exactly five, can be achieved in several different operable ways. In a first example (FIG. 6) of the embodiment having three active mirrors, the planar mirror M31 is tiltable about two axes of rotation, the planar mirror M32 is a non-tiltable, fixed mirror, the planar mirror M33 is tiltable about a first axis of rotation, and the planar mirror M34 is tiltable about two axes of rotation. In a second example (FIG. 6) of the embodiment having three active mirrors, the mirror M31 is a non-tiltable mirror, the planar mirror M32 is tiltable about two axes of rotation, the planar mirror M33 is tiltable about a first axis of rotation, and the planar mirror M34 is tiltable about two axes of rotation. In a third example (FIG. 7) of the embodiment having three active mirrors, the planar mirror M31 is tiltable about two axes of rotation, the planar mirror M32 is a non-tiltable mirror, the planar mirror M33 is tiltable about a second axis of rotation, and the planar mirror M34 is tiltable about two axes of rotation. In a fourth example (FIG. 7) of the embodiment having three active mirrors, the mirror M31 is a non-tiltable mirror, the planar mirror M32 is tiltable about two axes of rotation, the planar mirror M33 is tiltable about a second axis of rotation, and the planar mirror M34 is tiltable about two axes of rotation.

In the case of the embodiment of FIG. 2 having four active planar mirrors, one of the planar mirrors M41, M42, M43, and M44 is, tiltable about two axes of rotation that lie in the plane of the planar mirror, and three of the planar mirrors M41, M42, M43, and M44 are tiltable about at least one axis of rotation that lies in the plane of the mirror. Preferably, one of the planar mirrors M41, M42, M43, and M44 is tiltable about exactly two axes of rotation that lie in the plane of the mirror, and three of the planar mirrors M41, M42, M43, and M44 are tiltable about exactly one axis of rotation that lies in the plane of the mirror. The total number of axes of rotation of the planar mirrors M41, M42, M43, and M44 is at least five, and preferably exactly five.

The total number of axes of rotation equaling at least five, and preferably exactly five, can be achieved in several different operable ways. In a first example (FIG. 8) of the embodiment having four active mirrors, the planar mirror M41 is tiltable about a first axis of rotation, the planar mirror M42 is tiltable about a second axis of rotation, the planar mirror M43 is tiltable about a first axis of rotation, and the planar mirror M44 is tiltable about two axes of rotation. In a second example (FIG. 8) of the embodiment having four active mirrors, the planar mirror M41 is tiltable about a second axis of rotation, the planar mirror M42 is tiltable about a first axis of rotation, the planar mirror M43 is tiltable about a first axis of rotation, and the planar mirror M44 is tiltable about two axes of rotation. In a third example (FIG. 9) of the embodiment having four active mirrors, the planar mirror M41 is tiltable about a first axis of rotation, the planar mirror M42 is tiltable about a second axis of rotation, the planar mirror M43 is tiltable about a second axis of rotation, and the planar mirror M44 is tiltable about two axes of rotation. In a fourth example (FIG. 9) of the embodiment having four active mirrors, the planar mirror M41 is tiltable about a second axis of rotation, the planar mirror M42 is tiltable about a first axis of rotation, the planar mirror M43 is tiltable about a second axis of rotation, and the planar mirror M44 is tiltable about two axes of rotation.

In the case of the embodiment of FIG. 3 having five active planar mirrors, all five of the planar mirrors M51, M52, M53, M54, and M55 are tiltable about at least one axis of rotation that lies in the plane of the mirror. Preferably, all five of the planar mirrors M51, M52, M53, M54, and M55 are tiltable about exactly one axis of rotation that lies in the plane of the mirror. The total number of axes of rotation of the planar mirrors M51, M52, M53, M54, and M55 is at least five, and preferably exactly five.

The total number of axes of rotation equaling at least five, and preferably exactly five, can be achieved in several different operable ways. In a first example (FIG. 10) of the embodiment having five active mirrors, the planar mirror M51 is tiltable about a second axis of rotation, the planar mirror M52 is tiltable about a first axis of rotation, the planar mirror M53 is tiltable about a first axis of rotation, the planar mirror M54 is tiltable about a second axis of rotation, and the planar mirror M55 is tiltable about a first axis of rotation. In a second example (FIG. 10) of the embodiment having five active mirrors, the planar mirror M51 is tiltable about a second axis of rotation, the planar mirror M52 is tiltable about a first axis of rotation, the planar mirror M53 is tiltable about a first axis of rotation, the planar mirror M54 is tiltable about a second axis of rotation, and the planar mirror M55 is tiltable about a first axis of rotation. In a third example (FIG. 11) of the embodiment having five active mirrors, the planar mirror M51 is tiltable about a first axis of rotation, the planar mirror M52 is tiltable about a second axis of rotation, the planar mirror M53 is tiltable about a first axis of rotation, the planar mirror M54 is tiltable about a first axis of rotation, and the planar mirror M55 is tiltable about a second axis of rotation. In a fourth example (FIG. 11) of the embodiment having five active mirrors, the planar mirror M51 is tiltable about a first axis of rotation, the planar mirror M52 is tiltable about a second axis of rotation, the planar mirror M53 is tiltable about a second axis of rotation, the planar mirror M54 is tiltable about a first axis of rotation, and the planar mirror M55 is tiltable about a second axis of rotation.

In some geometries of interest, the center of rotation of each of the mirrors (active and inactive) may be positioned at a vertex of a geometrical shape defining a portion of a parallelopiped. In a preferred case of such a geometry, the center of rotation of each of the mirrors is positioned at a vertex of a geometrical shape defining a portion of a rectangular parallelopiped. For example, in the embodiments of FIGS. 1-3, the center of rotation of each of the mirrors is positioned at a vertex of a cube, which is a rectangular parallelopiped.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A five-degree-of-freedom beam-steering apparatus, comprising:
a set of planar tiltable mirrors positioned to define a radiation beam path therebetween, wherein the set of planar tiltable mirrors comprises from three to five planar tiltable mirrors, wherein each of the planar tiltable mirrors has a center of rotation lying in a plane of the mirror, and wherein each of the planar tiltable mirrors is tiltable about one axis of rotation or two orthogonal axes of rotation that lie in the plane of the mirror, wherein the total number of axes of rotation about which the planar tiltable mirrors of the set of planar tiltable mirrors can tilt is at least five independent degrees of freedom; and
a mirror drive system that tilts each respective planar mirror about its respective axis of rotation or axes of rotation.

2. The beam-steering apparatus of claim 1, wherein the total number of axes of rotation about which the planar tiltable mirrors of the set of planar tiltable mirrors can tilt is at least five.

3. The beam-steering apparatus of claim 1, wherein the total number of axes of rotation about which the planar tiltable mirrors of the set of planar tiltable mirrors can tilt is exactly five.

4. The beam-steering apparatus of claim 1, wherein the set of planar mirrors comprises exactly three planar tiltable mirrors, and wherein two of the planar mirrors are tiltable about two axes of rotation that lie in the plane of the planar mirror and one of the planar mirrors is tiltable about at least one axis of rotation that lies in the plane of the planar mirror.

5. The beam-steering apparatus of claim 1, wherein the set of planar mirrors comprises exactly three planar tiltable mirrors, and wherein two of the planar mirrors are tiltable about exactly two axes of rotation that lie in the plane of the mirror and one of the planar mirrors is tiltable about exactly one axis of rotation that lies in the plane of the mirror.

6. The beam-steering apparatus of claim 1, wherein the set of planar mirrors comprises exactly four planar tiltable mirrors, and wherein one of the planar mirrors is tiltable about two axes of rotation that lie in the plane of the mirror and three of the planar mirrors are tiltable about at least one axis of rotation that lies in the plane of the mirror.

7. The beam-steering apparatus of claim 1, wherein the set of planar mirrors comprises exactly four planar tiltable mirrors, and wherein one of the planar mirrors is tiltable about exactly two axes of rotation that lie in the plane of the mirror and three of the planar mirrors are tiltable about exactly one axis of rotation that lies in the plane of the mirror.

8. The beam-steering apparatus of claim 1, wherein the set of planar mirrors comprises exactly five planar tiltable mirrors, and wherein all five of the planar mirrors are tiltable about at least one axis of rotation that lies in the plane of the mirror.

9. The beam-steering apparatus of claim 1, wherein the set of planar mirrors comprises exactly five planar tiltable mirrors, and wherein all five of the planar mirrors are tiltable about exactly one axis of rotation that lies in the plane of the mirror.

10. The beam-steering apparatus of claim 1, further including a support structure in which the set of planar mirrors is supported, wherein the set of planar mirrors is not rotatable as a unit with respect to the support structure.

11. The beam-steering apparatus of claim 1, wherein the mirror drive system tilts the planar mirrors in each case about its axis of rotation or axes of rotation by an amount of not more than 10 degrees.

12. The beam-steering apparatus of claim 1, wherein the set of planar mirrors further includes a non-tilting fold mirror.

13. The beam-steering apparatus of claim 1, wherein the center of rotation of each of the planar mirrors is positioned at a vertex of a geometrical shape defining a portion of a parallelopiped.

14. The beam-steering apparatus of claim 1, wherein the center of rotation of each of the planar mirrors is positioned at a vertex of a geometrical shape defining a portion of a rectangular parallelopiped.

15. The beam-steering apparatus of claim 1, wherein the set of planar tiltable mirrors includes at least two planar tiltable mirrors having the one axis of rotation or the two orthogonal axes of rotation consisting of, for each of the two planar tiltable mirrors, a second axis that lies in the plane of the mirror and is orthogonal to a first axis that lies in the plane of the mirror and is perpendicular to a reflecting plane containing an incident ray and a reflected ray.

16. A five-degree-of-freedom beam-steering apparatus, comprising:
a set of planar tiltable mirrors positioned to define a light beam path therebetween, wherein the set of planar tiltable mirrors comprises from three to five planar tiltable mirrors, wherein each of the planar tiltable mirrors has a center of rotation lying in a plane of the mirror, wherein each of the planar tiltable mirrors is tiltable about one axis of rotation or two orthogonal axes of rotation that lie in the plane of the mirror, wherein the total number of axes of rotation about which the planar tiltable mirrors of the set of planar tiltable mirrors can tilt is at least five, and wherein an input or output light beam path is steerable over two angular, one rotational, and two lateral-position independent degrees of freedom; and
a mirror drive system that tilts each respective planar mirror about its respective axis of rotation or axes of rotation.

17. The beam-steering apparatus of claim 16, wherein the set of planar tiltable mirrors consists of exactly three planar tiltable mirrors.

18. The beam-steering apparatus of claim 16, wherein the set of planar tiltable mirrors consists of exactly four planar tiltable mirrors.

19. The beam-steering apparatus of claim 16, wherein the set of planar tiltable mirrors consists of exactly five planar tiltable mirrors.

20. The beam-steering apparatus of claim 16, wherein the set of planar tiltable mirrors includes at least two planar tiltable mirrors having the one axis of rotation or the two orthogonal axes of rotation consisting of, for each of the two planar tiltable mirrors, a second axis that lies in the plane of the mirror and is orthogonal to a first axis that lies in the plane of the mirror and is perpendicular to a reflecting plane containing an incident ray and a reflected ray.

* * * * *

UNITED STATES PATENT AND TRADEMARK OFFICE
Certificate

Patent No. 7,648,249 B2                                                                                                 Patented: January 19, 2010

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Noah Z. Stahl, St. Petersburg, FL (US); Wendy S. Bartlett, Seminole, FL (US); Randall S. Brooks, Apollo Beach, FL (US); and Daniel Teijido, Clearwater, FL (US).

Signed and Sealed this Twenty-fifth Day of November 2014.

STEPHONE B. ALLEN
*Supervisory Patent Examiner*
Art Unit 2872
Technology Center 2800